UNITED STATES PATENT OFFICE.

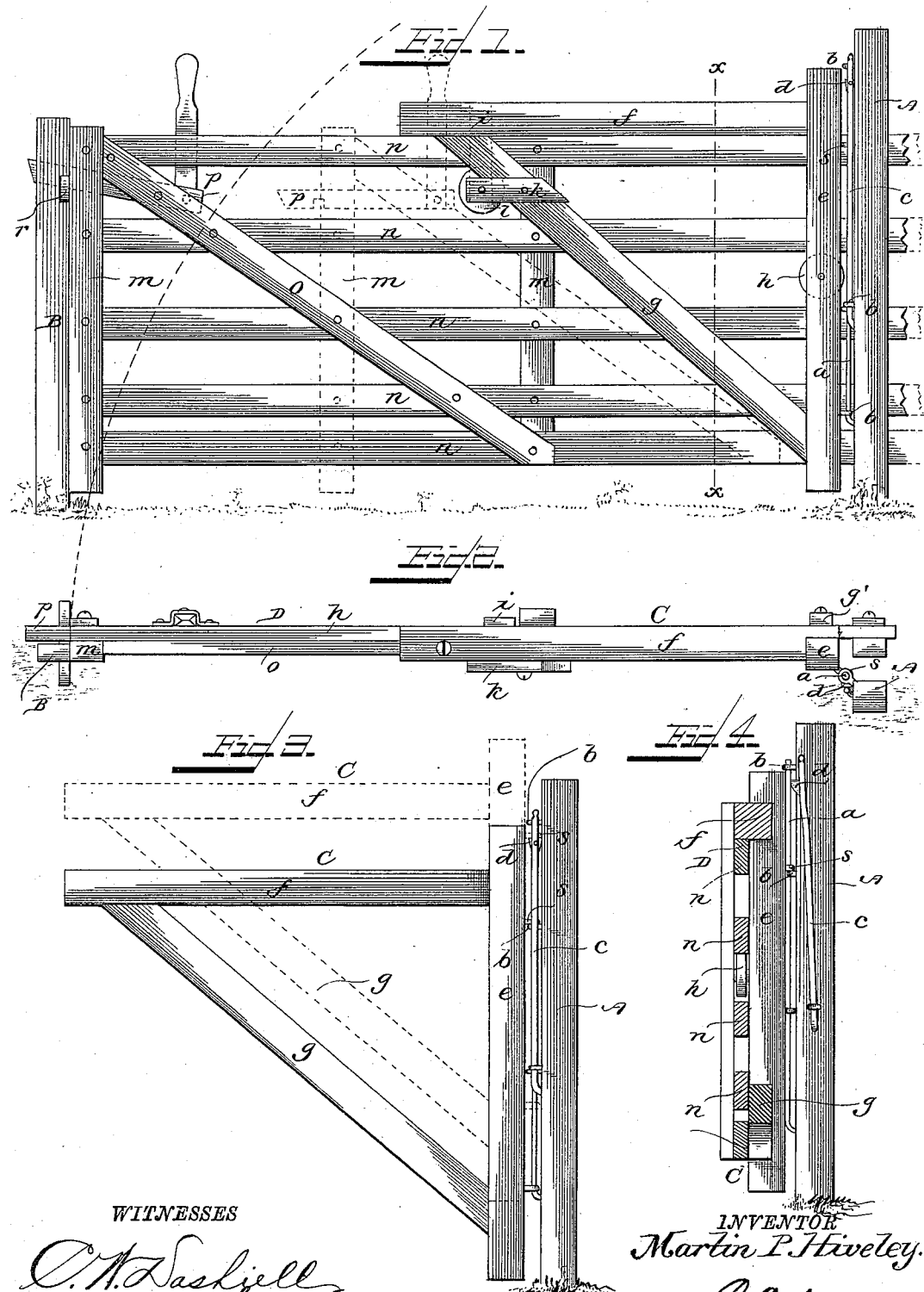

MARTIN PETERISON HIVELEY, OF VAN WERT, OHIO.

GATE.

SPECIFICATION forming part of Letters Patent No. 332,802, dated December 22, 1885.

Application filed July 7, 1885. Serial No. 170,898. (No model.)

*To all whom it may concern:*

Be it known that I, MARTIN P. HIVELEY, a citizen of the United States, residing at Van Wert, in the county of Van Wert and State of Ohio, have invented a new and useful Improvement in Gates, of which the following is a specification, reference being had to the accompanying drawings.

My invention relates to an improvement in gates; and it consists in the peculiar construction and combination of devices that will be more fully set forth hereinafter, and particularly pointed out in the claim.

In the accompanying drawings, Figure 1 is a side elevation of a gate embodying my invention. Fig. 2 is a top plan view of the same. Fig. 3 is a detailed view of the devices for hinging the gate to the post and permitting it to be raised above snow-drifts and for the passage of small animals. Fig. 4 is a vertical sectional view.

A represents the post to which the gate is hung, and B represents the post against which the gate closes.

To one corner of the post A is secured a vertical rod, $a$, by means of keepers $b$. A spring-bar, $c$, is also secured to the said post at one end, and the free end of the spring-bar has a supporting lug, $d$, that is inclined on one side, and bears normally against the rod $a$, near the upper end thereof.

C represents a swinging frame, composed of the vertical bar $e$, the horizontal top bar, $f$, and the diagonal brace-bar $g$, which extends from near the lower end of the bar $e$ to near the outer end of the bar $f$. The bar $f$ extends laterally beyond the side of the bar $e$ a slight distance, and to the outer side of the bar $f$ is secured a vertical bar, $g'$, that is in a line with the bar $e$, a space being left between these bars, as shown. A roller, $h$, is journaled between the bars $e$ and $g$, about the center thereof. Near the outer end of bar $f$, on the same side with bar $g'$, is secured a short depending bar, $i$. A horizontal bar, $k$, is secured to the diagonal brace-bar near the outer upper end of the latter, and between the outer end of this bar $k$ and the lower end of bar $i$ is journaled a roller, $l$, similar to roller $h$. The bar $e$ is pivoted on the rod $a$ by keepers $s$.

D represents the gate, which is composed of the vertical bars $m$, the horizontal bars $n$, and a diagonal brace-bar, $o$. The bars $n$ work in the space between the bars $e$ and $g$ of the swinging-frame, and the gate is suspended on the rollers, as shown and thereby permitted to be drawn back and forth, so as either to close the gateway, as shown in solid lines in Fig. 1, or partially to open the gateway, as indicated in dotted lines in the said figure. A latch, $p$, is provided for the gate, that is adapted to catch in a notched cross-bar, $r$, attached to post B, and thereby secure the gate when closed.

By having the gate suspended by and secured to the swinging frame hinged to post A it will be readily understood that the gate may be swung open to its full extent, as indicated by the dotted curved line in Fig. 2. In order to raise the gate, so that small animals may pass under it, or to enable it to clear a snow-drift, the swinging frame C will be raised on its pivotal rod $a$ until the lug $d$ of the spring-bar catches beneath the upper keeper $s$, when the gate will be supported and allowed to swing in a raised position, as shown in dotted lines in Fig. 3.

A gate thus constructed is light, strong, and simple, can either be opened partially or be swung open to its full extent, or raised above snow-drifts and for the passage of small animals, and is not likely to get out of order.

Having thus described my invention, I claim—

The combination, with the gate-post having the vertical rod and the spring-bar having the lug at its free end, of the swinging frame pivotally secured on the vertical rod and free to slide vertically thereon, and the sliding gate suspended by the swinging frame, substantially as described.

In testimony that I claim the foregoing as my own I have hereto affixed my signature in presence of two witnesses.

MARTIN PETERISON HIVELEY.

Witnesses:
CHAS. GORDON,
O. A. BALYEAT.